United States Patent
Dong et al.

(10) Patent No.: US 8,305,925 B2
(45) Date of Patent: Nov. 6, 2012

(54) METHOD, APPARATUS AND SYSTEM FOR TRANSPORTING MULTI-LANE ETHERNET SIGNAL

(75) Inventors: Limin Dong, Shenzhen (CN); Qiuyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 240 days.

(21) Appl. No.: 12/559,696

(22) Filed: Sep. 15, 2009

(65) Prior Publication Data

US 2010/0046951 A1  Feb. 25, 2010

Related U.S. Application Data

(63) Continuation of application No. PCT/CN2008/070481, filed on Mar. 12, 2008.

(30) Foreign Application Priority Data

Mar. 15, 2007  (CN) .......................... 2007 1 0086781

(51) Int. Cl.
*G01R 31/08* (2006.01)
*H04J 3/16* (2006.01)

(52) U.S. Cl. ....................................... 370/253; 370/437
(58) Field of Classification Search ................... 370/437, 370/253
See application file for complete search history.

(56) References Cited

U.S. PATENT DOCUMENTS

| | | | |
|---|---|---|---|
| 7,286,487 B2 * | 10/2007 | Perkins et al. | 370/253 |
| 7,447,214 B2 * | 11/2008 | Green | 370/395.51 |
| 2002/0027929 A1 | 3/2002 | Eaves | |
| 2003/0048813 A1 | 3/2003 | Lahav et al. | |
| 2004/0013129 A1 | 1/2004 | Fang | |
| 2004/0096213 A1 * | 5/2004 | Perkins et al. | 398/27 |
| 2004/0156325 A1 | 8/2004 | Perkins et al. | |
| 2005/0135434 A1 | 6/2005 | Choi et al. | |
| 2006/0104309 A1 * | 5/2006 | Vissers et al. | 370/474 |
| 2007/0248121 A1 | 10/2007 | Zou | |
| 2008/0131117 A1 * | 6/2008 | Cho et al. | 398/45 |

FOREIGN PATENT DOCUMENTS

| | | |
|---|---|---|
| CN | 1501640 | 6/2004 |
| CN | 1747606 | 3/2006 |
| CN | 1790993 | 6/2006 |
| CN | 101267386 | 12/2011 |
| WO | WO 2006/009732 | 1/2006 |

OTHER PUBLICATIONS

Internaltional Telecommunication Union, ITU-T G.709/Y.1331. Series G Transmission Systems and Media Digital Systems and Networks, Feb. 2011, all.*

(Continued)

*Primary Examiner* — Mark Rinehart
*Assistant Examiner* — Angel Brockman
(74) *Attorney, Agent, or Firm* — Staas & Halsey LLP (57) ABSTRACT

Methods, apparatuses and systems for transporting multi-lane Ethernet signal are disclosed. The method primarily includes utilizing a plurality of timeslot channels and justification bytes configured in the OPUk-Xv to build up multiple virtually concatenated transport lanes; and transporting a lane of independent Ethernet data via each lane in the multiple transport lanes. Such schema allows to transparently transport multi-lane Ethernet signal over OTN and addresses the uncontrollability of the time delay occurred when multi-lane Ethernet signal traverse over OTN. In addition, the problem that the frequency offset does not fit the IEEE definition of the Ethernet interface is solved.

13 Claims, 7 Drawing Sheets

OTHER PUBLICATIONS

ITU-T G.709/Y.1331 Interfaces for the Optical Transport Network (OTN), International Telecommunication Union, Mar. 2003 (118 pp.).

Written Opinion of the International Searching Authority, mailed Jun. 26, 2008, in corresponding International Application No. PCT/CN2008/070481 (3 pp.).

Extended European Search Report, mailed Mar. 31, 2010, in corresponding European Application No. 08715217.9 (6 pp.).

European Office Action dated Apr. 17, 2012 issued in corresponding European Patent Application No. 08715217.9.

The virtual concatenation technology in OTN, Study on Optical Communications, Mar. 2003, pp. 12-15, *and English Abstract*.

\* cited by examiner

METHOD, APPARATUS AND SYSTEM FOR TRANSPORTING MULTI-LANE ETHERNET SIGNAL

CROSS-REFERENCE TO RELATED APPLICATIONS

This application is a continuation of International Application No. PCT/CN2008/070481, filed on Mar. 12, 2008, which claims the benefit of Chinese Application No. 200710086781.0, filed on Mar. 15, 2007, both of which are hereby incorporated by reference in their entireties.

FIELD OF THE INVENTION

The present invention relates to network communication field, and more specifically, to a method, apparatus and system for transmitting multi-lane Ethernet signal.

BACKGROUND

Optical Transport Network (OTN), a core technology of a next generation transport network, includes technical specifications for electrical layer and optical layer. The OTN possesses a remarkable Operation, Administration and Maintenance (OAM) capability, a strong Tandem Connection Monitoring (TCM) capability, and a Forward Error Correction (FEC) capability. OTN is able to operate and manage a high volume traffic and has already become a mainstream technology for the backbone transport network.

In terms of service processing capability, OTN provides a strong capability in multi-service accessing. With the rapid development of data service, more and more Ethernet services are transported over OTN. Moreover, in a technical transition from Ethernet to telecommunication level, OTN is required to transparently transport Ethernet client service at a full rate to the utmost extent.

As a core technology of the next generation Ethernet, 100GE (100G Ethernet, a high-speed Ethernet) will become a primary interface to core routers. The 100GE may include multiple physical layer (PHY) interface devices at 10×10G, 5×20G and 4×25G, or may include a single PHY interface at 1×100G. The above mentioned multi-lane PHY 100GE interface may become the prevailing form for interfaces of 100GE at present.

Since it is difficult for a physical coding sublayer (PCS) of the multi-lane PHY 100GE interfaces to accomplish a virtual concatenation (VC)-like function of a transport network hierarchy, problems such as how to realize a multi-lane PHY 100GE in the OTN so as to transparently transmit the Ethernet client service at a full bit rate and how to eliminate the time delay occurred when multi-lane PHY 100GE interface traverses the OTN need to be addressed immediately.

In the prior art, a traditional method for transporting multi-lane PHY 100G Ethernet client service is a method of Medium Access Control (MAC) transparent transport. Specifically, 100GE MAC frames are extracted from the received multi-lane PHY 100G Ethernet client service. Then, the extracted MAC frames are adapted in accordance with a Generic Frame Protocol (GFP). A corresponding transport lane (e.g., Virtual Concatenation frame OPU2-11v which is 11 times the size of OPU2; Virtual Concatenation frame OPU1e-10v which is 10 times the size of OPU1E; Virtual Concatenation frame OPU2e-10v which is 10 times the size of OPU2E; or Virtual Concatenation frame OPU3-3v which is 3 times the size of OPU3) in OTN is selected to transmit the adapted MAC frames.

It is discovered that the method for transporting multi-lane PHY 100G Ethernet Client service has the following defects in the prior art. 100GE transparent transport at full bit rate cannot be achieved (i.e., the method in the prior art does not support the transport of private application information at PCS layer). Moreover, this method requires rearranging and splitting multiple lanes of 100GE client server signals, which increases the device complexity and cost.

In the prior art, a method for transporting multi-lane PHY 100G Ethernet client service is described below. Since a single multi-lane PHY signal among the multi-lane PHY 100G Ethernet signals may be transported independently with transparency, multiple transport lanes at 10G, 20G or 25G level (e.g., OPU2/OPU1e/OPU2e, OPU2-2v/OPU1e-2v/OPU1e-2v, or OPU2-3v/OPU1e-3v/OPU1e-3v) in OTN are selected accordingly and each single multi-lane PHY signal included in the multi-lane PHY signals of the 100G Ethernet client service is mapped into multiple independent transport lanes. The multiple independent transport lanes transport each single multi-lane PHY signal, respectively. After receiving the data, a receiving side recovers the single multi-lane PHY signal which is transmitted over each independent transport lane.

It is discovered that the method for transporting multi-lane PHY 100G Ethernet Client service in the prior art has the following defects. Since the transmission lanes of each independent transport lane are different, it is impossible to control the time delay for each independent transport lane. This would cause the actual delay of the 100G Ethernet client service signal to exceed the delay time acceptable by the 100GE multiple PHY interfaces, and eventually make the receiving party unable to recover the 100G Ethernet client service signal. Meanwhile, the frequency deviation of the client signals required by this method does not meet the IEEE definition of Ethernet interface.

SUMMARY

The present invention is directed to a method, apparatus and system for transparently transporting multi-lane Ethernet signal over OTN.

The embodiments of the present invention can be implemented according to the technical solutions below.

A method for transporting multi-lane Ethernet signal is provided according to an embodiment of the present invention. The method includes: configuring a corresponding number of timeslot channels in an Optical channel Payload Unit-k virtual concatenation frame (OPUk-Xv) based on the number of lanes of the multi-lane Ethernet signal; respectively carrying each lane of data in the multi-lane Ethernet signal via each timeslot channel in the corresponding number of timeslot channels; splitting the OPUk-Xv carrying multi-lane Ethernet signal into a plurality of Optical channel Transport Unit-k (OTUk) for transmission.

A method for receiving multi-lane Ethernet signal is provided according to an embodiment of the present invention. The method includes: acquiring, by a receiving side, optical channel payload unit-k (OPUk) carrying multi-lane Ethernet signal from received multiple OTUk; determining each timeslot channel based on the OPUk; extracting each lane of data in the multi-lane Ethernet signal from the timeslot channel so as to acquire multi-lane Ethernet signal.

An apparatus for transporting multi-lane Ethernet signal is provided according to an embodiment of the present invention. The apparatus includes:

a transport lane forming module, adapted to employ a plurality of timeslot channels configured in an Optical channel Payload Unit-k virtual concatenation frame (OPUk-Xv) to form a plurality of virtually concatenated timeslots channels;

a data processing module, adapted to populate each timeslot channel in the plurality of timeslot channels with a lane of Ethernet data in the multi-lane independent data, and split the OPUk-Xv carrying multi-lane Ethernet signal into a plurality of Optical channel Transport Unit-k (OTUk) for transmission.

A system for transporting multi-lane Ethernet signal is provided according to an embodiment of the present invention. The system includes a transmitting side and a receiving side.

The transmitting side is adapted to configure a corresponding number of timeslot channels in an Optical channel Payload Unit-k virtual concatenation frame (OPUk-Xv) based on the number of lanes of the multi-lane Ethernet signal; carry, respectively, each lane of data in the multi-lane Ethernet signal via each timeslot channel in the corresponding number of timeslot channels; split the OPUk-Xv carrying multi-lane Ethernet signal into a plurality of Optical channel Transport Unit-k (OTUk) for transmission.

The receiving side is adapted to acquire optical channel payload unit-k (OPUk) carrying multi-lane Ethernet signal from the received multiple OTUk; determine each timeslot channel based on the OPUk; extract each lane of data in the multi-lane Ethernet signal from the timeslot channel so as to acquire multi-lane Ethernet signal.

As can be seen from the foregoing technical solutions, the present invention provides a method for employing OTN virtual concatenation to transparently transport multi-lane Ethernet signal so that the multi-lane Ethernet signal (e.g., multi-lane PHY 100GE) is transported transparently over OTN. By virtually concatenating multiple OPUk, the problem that the uncontrollability of the time delay occurs when the multi-lane Ethernet signal traverse over OTN is solved. By setting justification bytes in each transport lane in the virtual concatenation frame, the frequency offset of the client signals acceptable by OPUk frame structure meets the IEEE definition of Ethernet interface.

DETAILED DESCRIPTION

A method, apparatus and system for transporting multi-lane Ethernet signal are provided according to various embodiments of the present invention.

Figure 1:
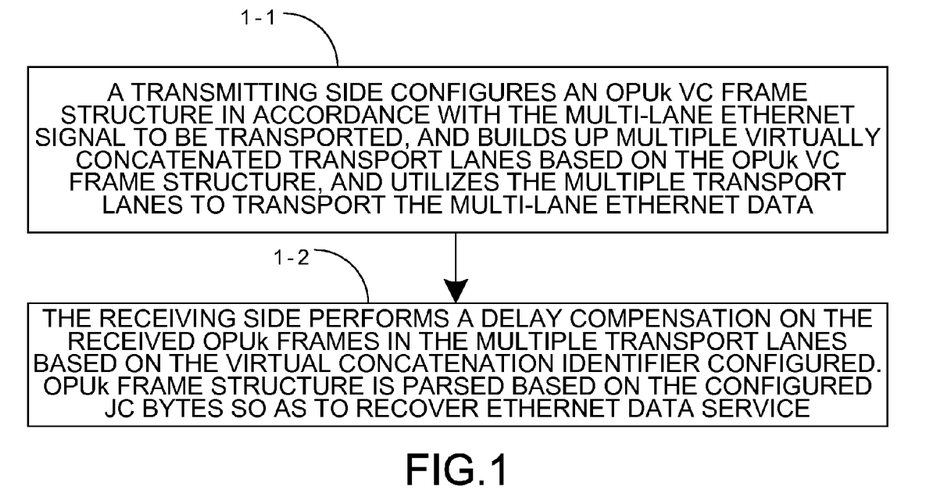
FIG. 1 is a flowchart of a method for transporting multi-lane Ethernet signal over OTN according to an embodiment of the present invention.

Embodiments of the present invention will be illustrated in detail in conjunction with the accompanying drawings. A flowchart of a method according to an embodiment of the present invention is illustrated in FIG. 1, which includes the following steps.

In Step 1-1, a transmitting side configures an OPUk Virtual Concatenation (VC) frame structure in accordance with the multi-lane Ethernet signal to be delivered, and builds up multiple virtually concatenated transport lanes based on the OPUk VC frame structure, and utilizes the multiple transport lanes to send the multi-lane Ethernet signal.

Figure 2:
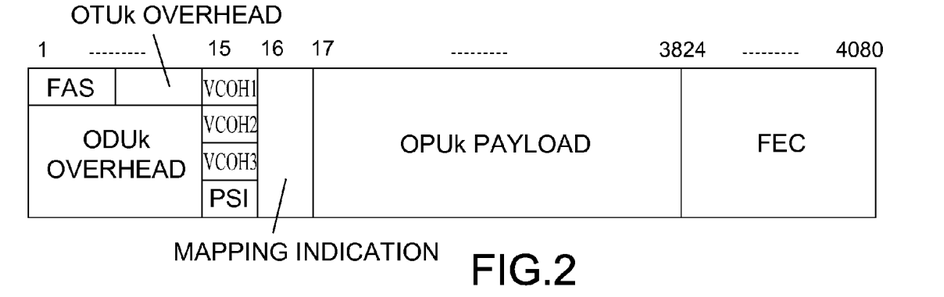
FIG. 2 is an OTN frame structure defined in the prior art.

FIG. 2 illustrates an OTN frame structure defined in the prior art. The frame structure includes 4×3824 bytes, i.e., 4 rows×3824 bytes/per row (3824 columns). As shown in FIG. 2, the first 1 to 16 bytes in the frame structure are OTN overhead bytes where columns 15 and 16 are OPUk overhead bytes which take up 4 rows×2 columns, i.e., 8 bytes in total. Columns 17 to 3824, which are total 4×3808 bytes, are OPUk payload portion for carrying service. The rest columns 3824 to 4080, which are total 4×256 bytes, are FEC portion.

Figure 3:
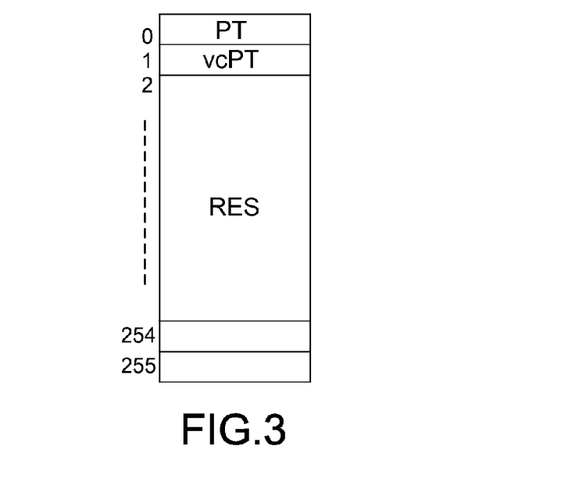
FIG. 3 is a multiframe structure of a PSI byte defined in the prior art.

The OPUk overhead bytes (OPUk OH) are used to indicate service to be adapted. The Payload Structure Identifier bytes in OPUk OH are used to indicate the type of service mapping structure. PSI byte is a multiframe structure of 0-255 periods. The multiframe structure of PSI bytes is illustrated in FIG. 3. The bytes in the first frame denote a payload type (TP) which is used to identify the service mapping type. The bytes in the second frame denote a virtual concatenation payload type (vcPT) which is used to identify the mapping manner for OPUk-Xv (Optical Channel Payload Unit-k Virtual Concatenation frame) structure. The bytes in other frames are reserved.

Columns 16-17 in the OTN frame structure as illustrated in FIG. 2 define three Justification Control (JC) bytes, one Negative Justification Opportunity (NJO) byte and one PJO (Positive Justification Opportunity) byte. The PJO and NJO are used, respectively, to compensate frequency difference between service data stream and Optical Channel Data Unit-k (ODUk) data stream.

One PJO or NJO byte may compensate a frequency offset of ±65 ppm. The fixed frequency difference for OTN at each rate level is ±20 ppm. Therefore, the OTN frame structure as illustrated in FIG. 2 may has a frequency offset of ±45 ppm (65 ppm−20 ppm) for client signals. The definition of frequency difference for Constant Bit Rate (CBR) 2G5, CBR 10G and CBR 40G services relating to Synchronous Digital Hierarchy (SDH) may meet this frequency difference range. However, the frequency offset of Ethernet interface defined by IEEE series is ±100 ppm. Therefore, the frequency offset of the client signal acceptable by the OTN frame structure shown in FIG. 2 does not meet the IEEE definition of Ethernet interface.

In order to transparently transporting multi-lane independent Ethernet signals over OTN and adapt to the frequency difference range of the Ethernet interface defined by IEEE series, the OTN frame structure in FIG. 2 is enhanced and a OPUk-Xv VC frame structure is provided according to an embodiment of the present invention.

In an embodiment of the present invention, in respect of the multi-lane independent Ethernet signal to be transported, the OPUk-Xv VC frame structure is designed to include PSI bytes, timeslot channels, PJO and JNO bytes and associated JC bytes corresponding to the number of lanes. The PJO and NJO bytes for each lane contain a number of PJO and NJO bytes adapted to the frequency offset of the client signals. Each timeslot channel and a corresponding number of PJO and NJO bytes constitute a transport lane. Each transport lane takes care of a lane of PHY signal in the multi-lane independent Ethernet signals. Then, the aforementioned OPUk-Xv VC frame structure is split into a plurality of OPUk frames which form X OTUks. These X OTUks are then transmitted to the OTN. In each transport lane, PSI bytes may be used to indicate the transport manner and mapping manner of multiple VC lanes, and JC bytes may be used to indicate whether it is justification information or Ethernet data that are populated in the PJO and NJO bytes.

In an embodiment of the present invention, the multi-lane independent data includes multi-lane PHY 10×10G, 5×20G or 4×25G 100GE signal. 10×10G, 5×20G and 4×25G 100GE signal are described as examples for illustration of OPUk-Xv VC frame structure designed according to an embodiment of the present invention.

Taking asynchronous CBR mapping manner for 10×10G multi-lane 100GE interface as an example, a type of Optical Channel Payload Unit such as OPU1, OPU2 or OPU3, or OPU1e or OPU2e is selected for transporting 10×10G multi-lane 100GE interface. Then, multiple OPUks are utilized to constitute an OPUk-Xv virtual concatenation group. Multiple transport lane timeslots are constructed in the OPUk-Xv VC group where each transport lane timeslot transmits a lane of PHY signal in the multi-lane independent Ethernet signals.

Figure 4:
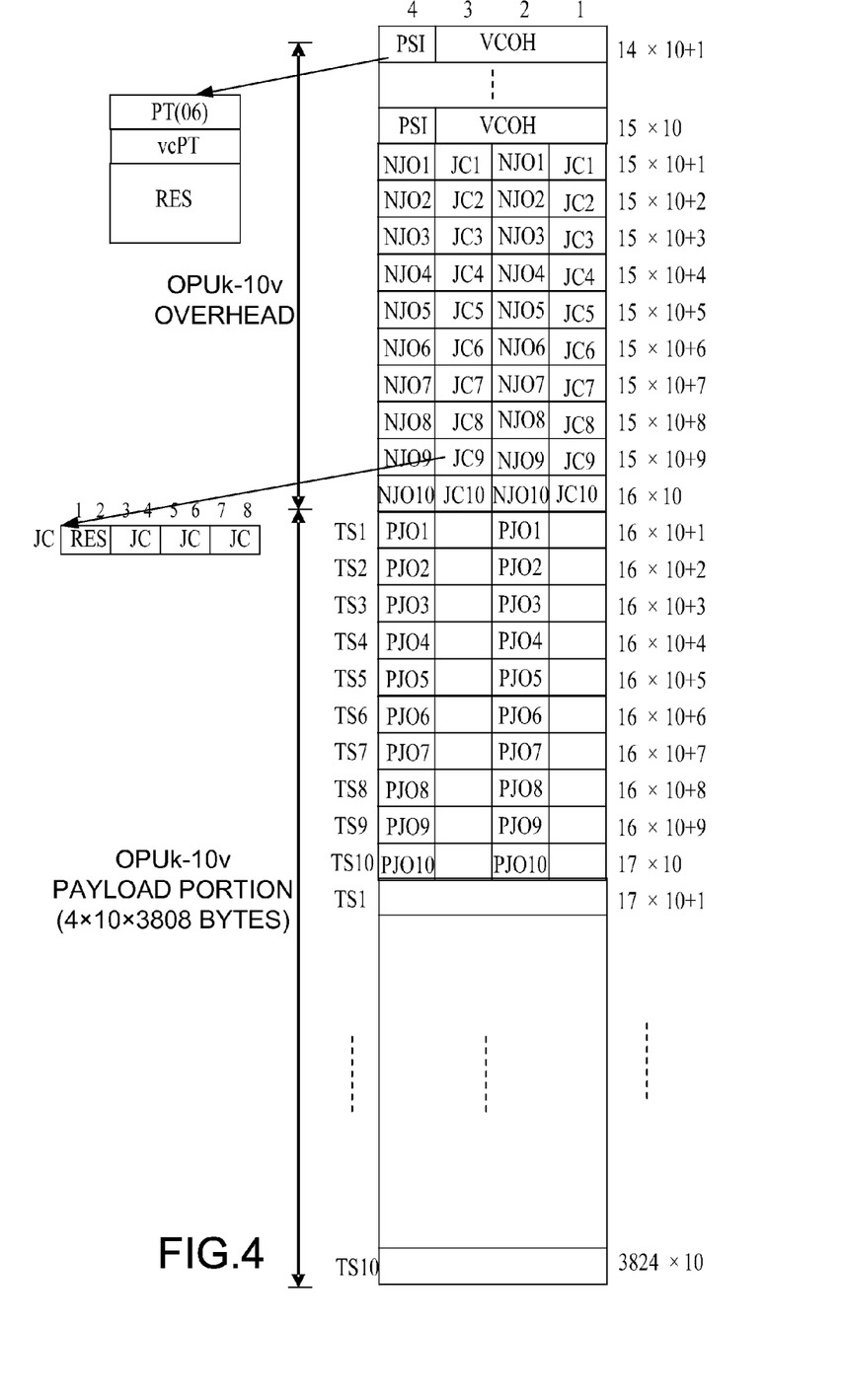
FIG. 4 is a schematic of a virtual concatenation frame structure where a 10×10G Ethernet signal is mapped into OPUk-10v according to an embodiment of the present invention.

In an embodiment, the "OPUk" as mentioned in "OPUk-10v transport lane" may refer to OPU1e or OPU2e. FIG. 4 is a schematic of a virtual concatenation frame structure where a 10×10G Ethernet signal is mapped into OPUk-10v according to an embodiment of the present invention.

FIG. 4 is a frame structure where 10 OPUk are virtually concatenated into an OPUk-10v. The frame includes 2×10 columns of OPUk-10v overhead portion (i.e., column 14×10+1 to column 16×10) and 10×3808 columns of OPUk-10v payload portion (i.e., column 16×10+1 to column 3824×10). The OPUk-10v overhead portion includes 10 columns of VCOH/PSI bytes and 10 columns of JC/NJO bytes. Each column in the 10 columns of JC/NJO bytes corresponds to one PHY interface in the 10×10G multi-lane 100GE.

A corresponding location in the OPUk-10v payload portion is allocated with 20 PJO bytes. 10×3808 columns of OPUk-10v payload portion are divided into 10 timeslots by column. Each timeslots includes 3808×4 bytes in total. 10 pieces of independent PHY information in 10×10G multi-lane 100GE interface corresponds to the above 10 timeslots, respectively.

After receiving 10×10G multi-lane PHY 100GE signals, the transmitting side extracts clock information of the multi-lane PHY 100GE and constructs an OPUk-10v frame structure as illustrated in FIG. 4. 10 lanes of PHY information of the 10×10G multi-lane 100GE are mapped into 10 transport lanes in the above OPUk-10v payload portion, respectively.

Based on the difference between 100GE clock and system clock, each lane of PHY information utilizes 2 pairs of JC/NJO/PJO bytes to adjust respective frequency difference between each lane of PHY information and each timeslot channel in OPUk-10v payload portion. 2 pairs of NJO/PJO are able to compensate $2/(3808\times4)=\pm130$ ppm where clock frequency deviation for OPUk is $\pm20$ ppm. Therefore, it may tolerate the +100 ppm frequency offset of a single PHY of 10×10G multi-lane 100GE signal. If the adopted OPUk is a transport lane with a populating approach, e.g., OPU2e, the mapping frame must reserve a corresponding area for population.

JC is a justification control byte, used to indicate whether the content in the NJO/PJO bytes is justification information or Ethernet data. Bits 1-2 in the JC bytes are reserved bits. Bits 3-8 are used to indicate the content of NJO/PJO. The indication rule for JC byte is defined in Table 1.

TABLE 1

| JC Bit: 7 8 | NJO | PJO |
|---|---|---|
| 0 0 | Justification byte | Data byte |
| 0 1 | Data byte | Data byte |
| 1 1 | Justification byte | Data byte |
| others | | none |

The contents in bits 7 and 8 and the contents in bits 3 and 4, bits 5 and 6 in the JC byte are the same. In practice, when the contents in bits 3 and 4, 5 and 6 and 7 and 8 are different, a principle of being decided by a majority vote is adopted so that error code in the justification information can be avoided.

Related virtual concatenation indication information is inserted into the PSI bytes in the OPUk-10v frame structure as shown in FIG. 4. For instance, PT[0]=xxx or PT[1]=xxx may be defined for the PSI bytes, indicating that a multi-lane VC frame and asynchronous bit CBR mapping manner are adopted.

Then, OPUk-10v VC frame in which 10×10G multi-lane 100GE is mapped is split into 10 individual OPUk frames. Corresponding overhead bytes are inserted in each individual OPUk frame. In this way, 10 individual OTUk frames are formed and transmitted to the OTN.

In Step 1-2, the receiving side performs a delay compensation on the received OPUk frames in the multiple transport lane based on the virtual concatenation identifier configured. OPUk frame structure is parsed based on JC bytes configured so as to recover Ethernet data service.

After receiving the 10 individual virtually concatenated OTUk frames from the transmitting side, the receiving side identifies, based on the indication populated in the PSI bytes in the received OTUk frame of each lane, that the OTUk frame is a multi-lane VC frame. The first received OTUk frame is then stored in a storage unit and a VC delay compensation is performed. Data recovery is not performed until all 10 individual OTUk frames are received. Accordingly, the problem that the uncontrollability of the actual transmission delay occurs when Ethernet data traverse over the OTN due to the inconformity of the transport lane of each lane can be addressed.

Subsequently, the receiving side may parse the JC bytes in the OPUk frame in each transport lane according to the indication rule for JC bytes shown in Table 1, and identify, based on the JC bytes, whether it is justification information or Ethernet data that is populated in the NJO and PJO bytes. When it is justification information that is populated in the NJO or PJO bytes, the justification information populated in the NJO or PJO bytes need to be removed from the received Ethernet client data stream. As a result, the Ethernet client data stream may leave a random cutout. Accordingly, a phaselocked loop is required to smooth the cutout, eliminate the jitter, and recover the clock of the Ethernet client data stream.

Finally, the receiving side may integrate the recovered 10 individual Ethernet data and recovers the 10×10G multi-lane PHY 100G Ethernet data transmitted from the transmitting side.

When 10×10G 100 GE line capabilities are being adjusted, the embodiment of the present invention is able to adjust the transport capability of OPUk-10v accordingly based on the actual line capability of the 100GE so as to fully utilize the transport network resources. If 10×10G multi-lane 100GE adjusts the line capability to 9×10G based on MAC traffic, Link Capacity Adjustment Scheme (LCAS) protocol is capable of reducing one OPUk transport lane in the OPUk-10v VC frame structure based on the actual link capacity of 100GE and form an OPUk-9v VC. Since the JC/NJO/PJO bytes corresponding to each lane of PHY of multi-lane PHY 100GE and the timeslot channel are independent of each other in the OPUk-10v frame, the reducing of the number of transport lanes will not influence the transport of other PHY information of multi-lane PHY 100GE.

Figure 5:
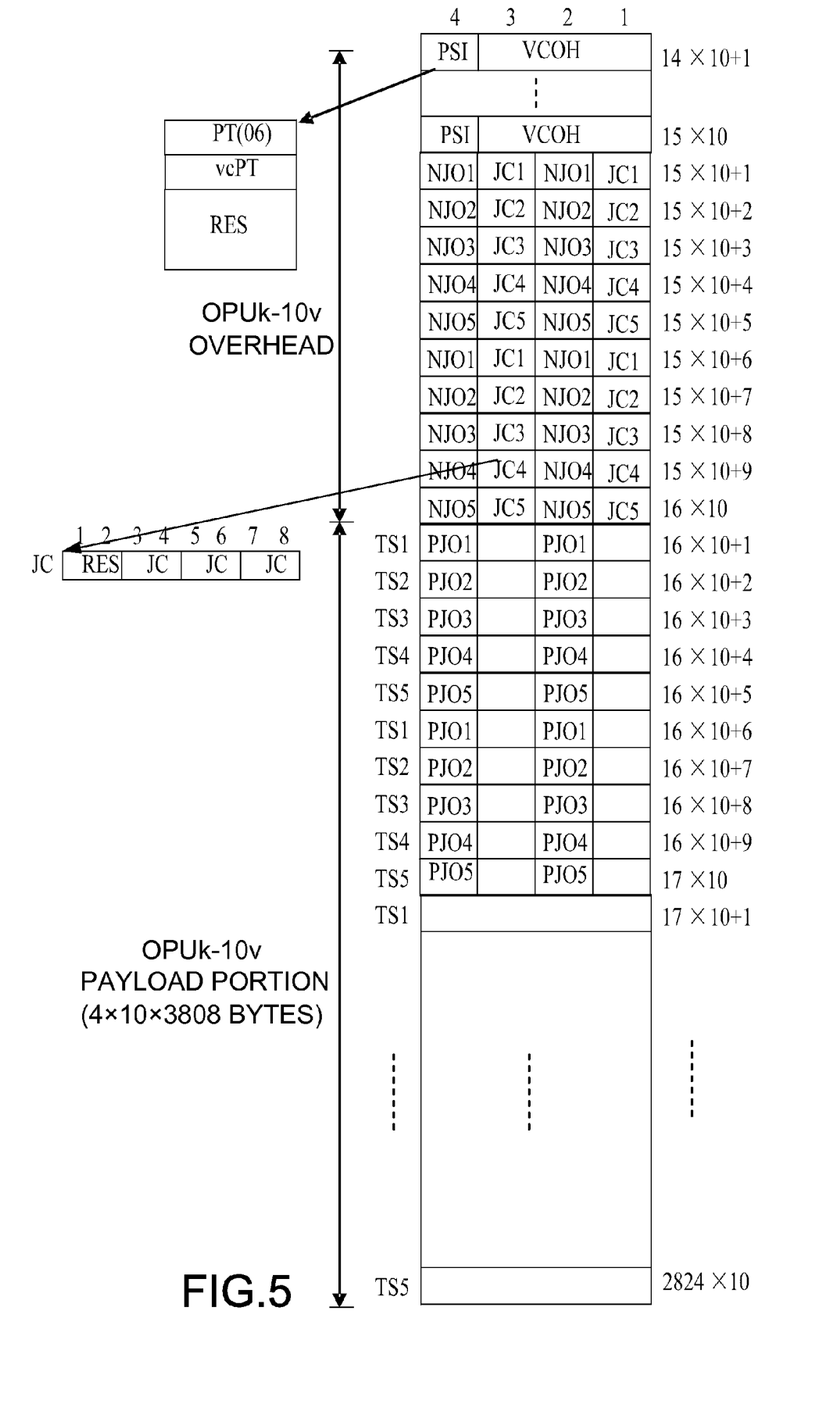
FIG. 5 is a schematic of a virtual concatenation frame structure where a 5×20G Ethernet signal is mapped into OPUk-10v according to an embodiment of the present invention.

For 5×20G 100GE interface, FIG. 5 illustrates a schematic of a virtual concatenation frame structure where a 5×20G Ethernet signal is mapped into OPUk-10v according to an embodiment of the present invention.

In the OPUk-10v VC structure illustrated in FIG. 5, the OPUk-10v payload portion is divided into 5 timeslots. The number of bytes for a single timeslot of OPUk-10v associated with each lane of PHY corresponds is 3808×2×4. Frequency offset of each lane of PHY information is justified asynchronously by 4 pairs of NJO/PJO. Since a pair of NJO/PJO bytes is able to provide a frequency offset of 1/(3808×4×2)=±32.5 ppm, 4 pairs of NJO/PJO bytes are able to provide a frequency offset of 130 ppm compared with ±20 ppm regarding OPUk. Therefore, the OPUk-10v VC frame structure is able to tolerate a frequency offset of ±100 ppm for a single PHY of 5×20G 100GE signal.

5 lanes of PHY information of 5×20G 100GE are mapped respectively to 5 timeslot channels in the aforementioned OPUk-10v payload portion. 4 pairs of NJO and PJO to which each timeslot channel corresponds are utilized to perform an asynchronous adjustment on frequency difference. Then, the OPUk-10v VC frame as illustrated in FIG. 5 is split into 10 individual OPUk frames. Associated overhead bytes inserted in each lane of OPUk frame so as to form 10 individual OTUk frames which are then transported to OTN.

Likewise, when 5×20G 100GE line capability is adjusted to 4×20G or to another line rate, LCAS is employed to reduce 2 OPUk transport lanes or other number of OPUk transport lanes in the OPUk-10v VC frame structure as illustrated in FIG. 5 so as to maximize the utilization of the network resources. Since the JC/NJO/PJO bytes in the transport lane corresponding to each lane of PHY of 5×20G 100GE interface and the timeslot channel are independent of each other in the OPUk-10v frame, the reducing of the number of OPUks will not affect the transport of other PHY information of 5×20G 100GE.

Figure 6:
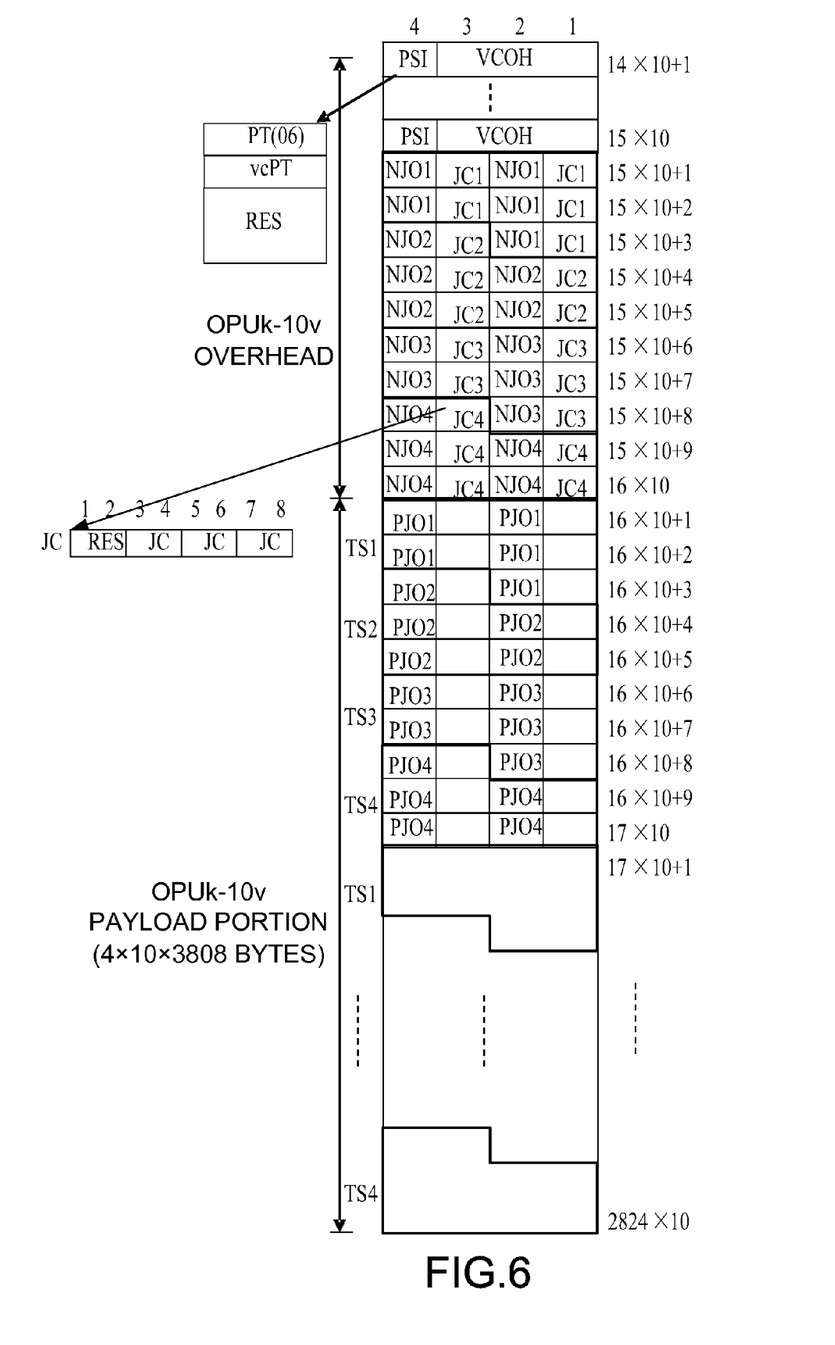
FIG. 6 is a schematic of a virtual concatenation frame structure where a 4×25G Ethernet signal is mapped into OPUk-10v according to an embodiment of the present invention.

For 4×25G 100GE interface, FIG. 6 illustrates a schematic of a virtual concatenation frame structure where a 4×25G Ethernet signal is mapped into OPUk-10v according to an embodiment of the present invention.

In the OPUk-10v VC frame structure illustrated in FIG. 6, the OPUk-10v payload portion is divided into 4 timeslots, where the number of bytes for a timeslot associated with each lane of PHY is 3808×10×4/4=38080. Frequency offset for each lane of PHY information is adjusted asynchronously by 5 pairs of NJO/PJO. Since a pair of NJO/PJO bytes is able to provide a frequency offset of 1/(3808×4×4/4)=±26 ppm, 5 pairs of NJO/PJO bytes are able to provide a frequency offset of 130 ppm compared with ±20 ppm regarding OPUk. Therefore, the OPUk-10v VC frame structure is able to tolerate a frequency offset of +100 ppm for a single PHY of 5×20G 100GE signal. 4 lanes of PHY information of 4×25G 100GE are mapped respectively to 4 timeslot channels in the aforementioned OPUk-10v payload portion. 5 pairs of NJO and PJO which each timeslot channel corresponds to are utilized to perform an asynchronous adjustment on frequency difference. Then, the OPUk-10v VC frame as illustrated in FIG. 6 is split into 10 individual OPUk frames. Associated overhead bytes are inserted in each lane of OPUk frame so as to form 10 individual OTUk frames which are then transported to OTN.

Likewise, when 4×25G 100GE line capacity is adjusted to 3×25G or to other line rate, LCAS is employed to reduce 2 OPUk transport lanes or other number of OPUk transport lanes in the OPUk-10v VC frame structure as illustrated in FIG. 6. Fixed population needs to be performed on the rest timeslot bytes so as to absorb a 5G rate difference. Since the JC/NJO/PJO bytes in the transport lane corresponding to each lane of PHY of 4×25G 100GE interface and the timeslot channel are independent of each other in the OPUk-10v frame, the reducing of the number of OPUks will not affect the transport of other PHY information of 4×25G 100GE.

Figure 7:
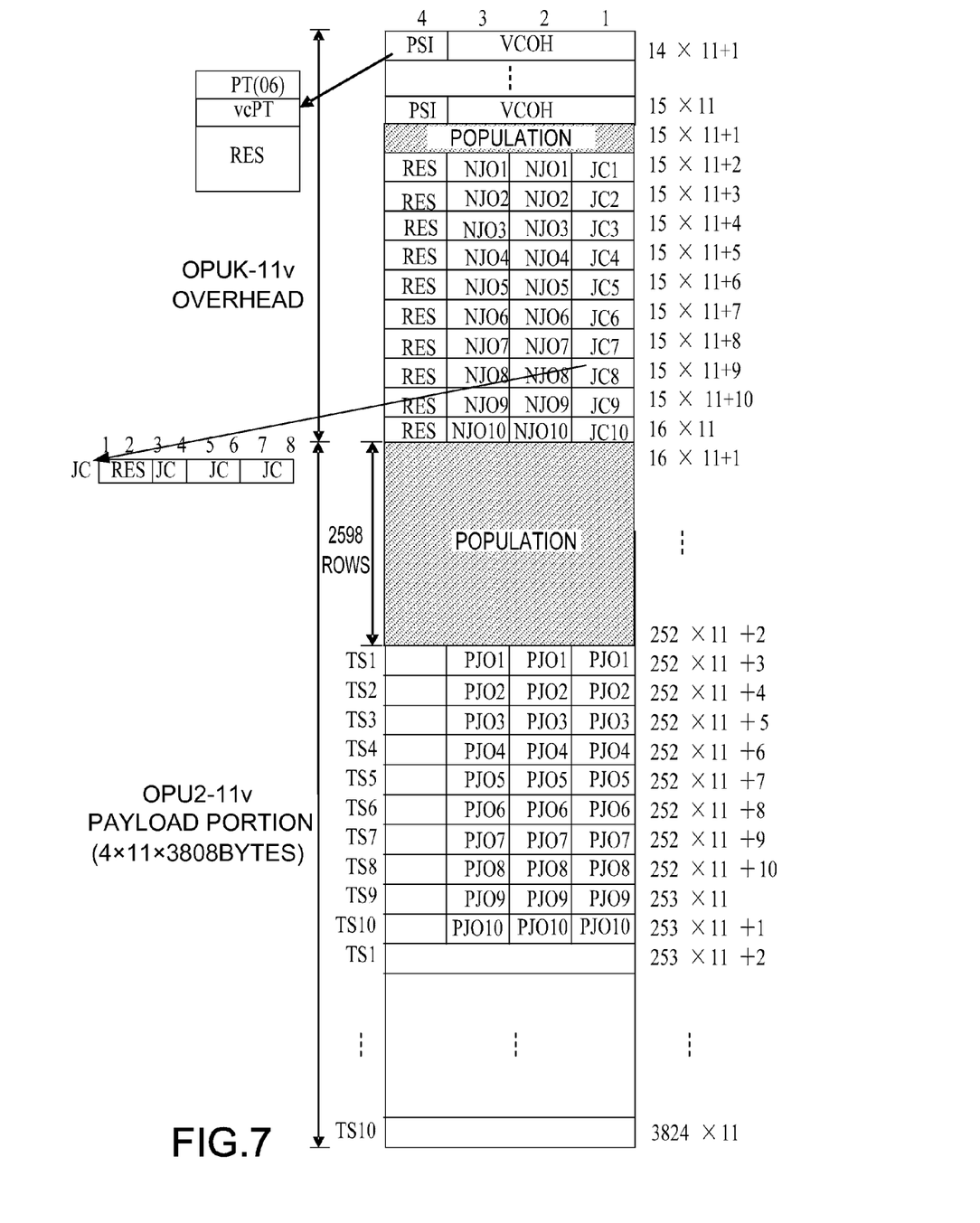
FIG. 7 is a schematic of a virtual concatenation frame structure where a 10×10G Ethernet signal is mapped into OPU2-11v according to an embodiment of the present invention.

For OPU2-11v transport lane, FIG. 7 illustrates a schematic of a virtual concatenation frame structure where a 10*10G Ethernet signal is mapped into OPUk2-11v according to an embodiment of the present invention.

In the OPU2-11v VC structure illustrated in FIG. 7, a fixed population is performed on 2598 columns among 3808×11=41888 columns in the OPU2-11v payload portion. The rest 39290 columns are divided into 10 timeslots. The number of bytes for each timeslot of OPUk-10v associated with each lane of PHY is 3929×4. The transport bandwidth of OPU2-11v is 238/237×9.953280×11 Gb/s, the total transport bandwidth of the rest 39290 columns is 39290/41888×238/237×9.953280×11 Gb/s, i.e., 103.128 Gb/s or so. The transport bandwidth for each timeslot is 10.3128 Gb/s. A fixed frequency offset between 10.3128 Gb/s and 10.3125 Gb/s is 0.0003/10.3128=+29 ppm. Considering the OTN frequency offset of ±20 ppm and the Ethernet frequency offset of ±100 ppm, the total frequency offset is −91 ppm~+149 ppm. Each timeslot employs two pairs of NJO bytes, 3 pairs of PJO bytes. Two pairs of NJO bytes are able to provide a capability for adjusting frequency offset of 2/(3929×4)=2/15716=−127 ppm. Three pairs of PJO bytes are able to provide a capability for adjusting frequency offset of 3/15716=+190 ppm. Therefore, each timeslot is able to provide a capability for adjusting frequency offset of −127 ppm~+190 ppm, which is able to meet the requirement of frequency offset of the client signal.

The indication rule of JC bytes is defined in Table 2.

TABLE 2

| JC Bit: 7 8 | NJO | NJO | PJO | PJO | PJO |
|---|---|---|---|---|---|
| 0 0 | judging byte | judging byte | data byte | data byte | data byte |
| 0 1 | data byte | data byte | data byte | data byte | data byte |
| 1 1 | judging byte | judging byte | judging byte | judging byte | judging byte |
| others | | | none | | |

The content in bits 7 and 8 and the content in bits 3 and 4, bits 5 and 6 in the JC byte are the same. In practice, when the contents in bits 3 and 4, 5 and 6 and 7 and 8 are different, a principle of being decided by majority is adopted so that error code in the adjustment information can be avoided.

10 lanes of PHY information of 10×10G multi-lane 100GE are mapped respectively to 10 timeslot channels in the aforementioned OPU2-11v payload portion. 2 pairs of NJOs and 3 pairs of PJOs that each timeslot channel corresponds to are utilized to perform an asynchronous adjustment on frequency offset. Then, associated overhead bytes are inserted in each lane in OPU2 frame so that ODU2 frame of 11 lanes is formed. Further, corresponding line overhead is inserted so that OTU2 frame of 11 lanes is formed. Such OTU2 frame is then transported to OTN. ODU2 of 11 lanes may be further multiplexed with ODU3 or ODU4 to form a high-speed transport frame which is then transported to OTN.

Likewise, in case of 5×20G and 4×25G multi-lane independent 100G Ethernet interface, the method according to an embodiment of the present invention may be applied to the OPU2-11v transport lane for transporting Ethernet signal.

Figure 8:
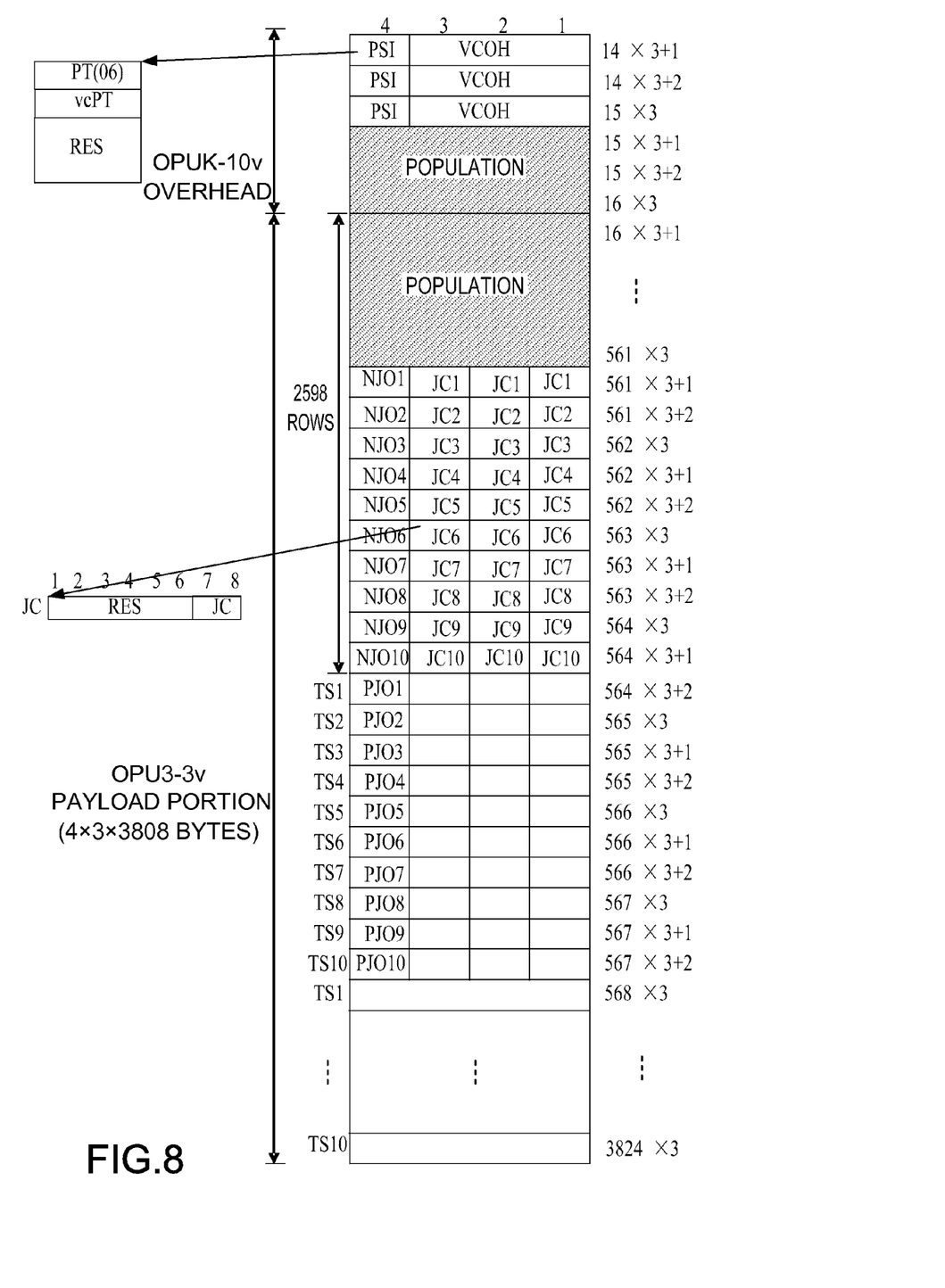
FIG. 8 is a schematic of a virtual concatenation frame structure where a 10×10G Ethernet signal is mapped into OPU3-3v according to an embodiment of the present invention.

For OPU3-3v transport lane, FIG. 8 illustrates a schematic of a virtual concatenation frame structure where a 10*10G Ethernet signal is mapped into OPU3-3v according to an embodiment of the present invention.

In the OPU3-3v VC structure illustrated in FIG. 8, a fixed population is performed on 1644 columns among 3808×11=11424 columns in the OPU3-3v payload portion. The rest 9780 columns are divided into 10 timeslots. JC bytes and NJO bytes are situated in the fixed population area in the OPU3-3v payload portion. The transport bandwidth for OPU3-3v is 238/236×39.813 120×3 Gb/s. The total transport bandwidth for the rest 9780 columns is 9780/11424×238/236×39.813120×3 Gb/s which is around 103.117 Gb/s. The transport bandwidth for each timeslot is 10.3117 Gb/s. The fixed frequency difference between 10.3117 Gb/s and 10.3125 Gb/s is 0.0008/10.3117=−78 ppm. Considering the OTN frequency offset of ±20 ppm and the Ethernet frequency offset of ±100 ppm, the total frequency offset is −198 ppm~+42 ppm. Each timeslot employs a pair of PJO and NJO bytes to provide a capability for adjusting frequency offset of 1/(978×4)=±256 ppm, which is able to meet the requirement of frequency offset of the client signal.

The indication rule of JC bytes is defined in Table 1. Bits 1 to 6 in JC byte are reserved. Only bits 7 and 8 in JC byte are used. Three JC bytes are used. In practice, when the content of three JC bytes are difference, the principle of being decided by majority is employed so as to avoid error code in adjusting information.

10 lanes of PHY information of 10×10G multi-lane 100GE are mapped respectively to 10 timeslot channels in the aforementioned OPU3-3v payload portion. 1 pair of NJO and PJO that each timeslot channel corresponds to is utilized to perform an asynchronous adjustment on frequency difference. Then, corresponding overhead bytes are inserted in each lane in OPU3 frame, and corresponding lane overhead is also inserted so that OTU3 frame of 3 lanes is formed. Such OTU3 frame is then transported to OTN. ODU3 of 3 lanes may be further multiplexed with ODU4 to form a high-speed transport frame which is then transported to OTN.

Likewise, in case of 5×20G and 4×25G multi-lane independent 100G Ethernet interface, the method according to an embodiment of the present invention may be applied to the OPU3-3v transport lane for transporting Ethernet signal.

Figure 9:
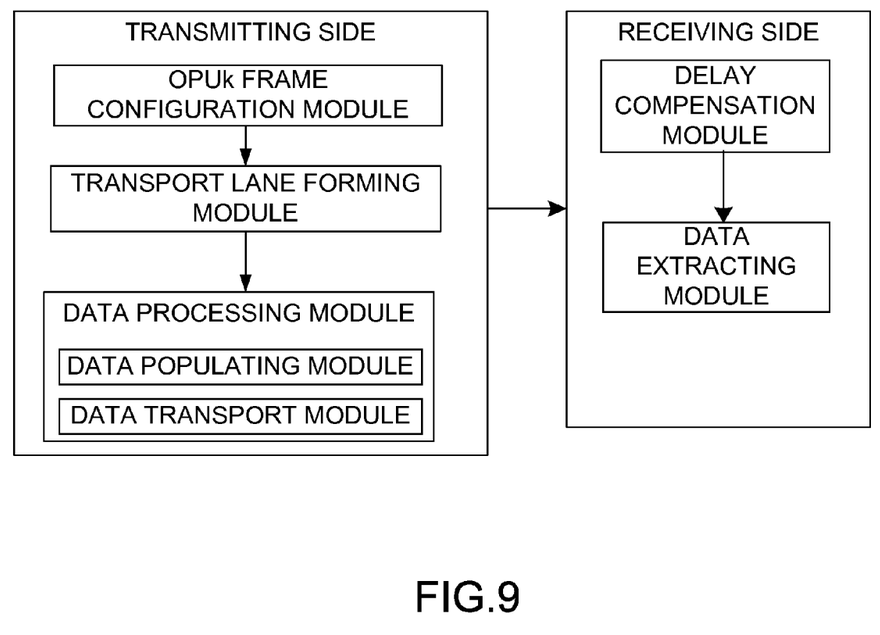
FIG. 9 is a block diagram of a system for transporting multi-lane Ethernet signal over OTN according to an embodiment of the present invention.

FIG. 9 illustrates a system according to an embodiment of the present invention. The system includes a transmitting side and a receiving side.

The transmitting side is adapted to configure a corresponding number of timeslot channels in OPUk-Xv VC frame based on the number of lanes in the multi-lane Ethernet signal; carry the data of each line in the multi-lane Ethernet signal via each channel in the corresponding number of timeslot channels; split the OPUk-Xv which carries multi-lane Ethernet signal into a plurality of OTUk for transmission. The transmitting side is further adapted to configure a plurality of timeslot channels, NJO and PJO bytes and corresponding JC bytes in the OPUk-Xv VC frame structure; divide the OPUk-Xv VC frame into a plurality of transport lanes; populate each lane in multiple transport lanes with a lane of Ethernet data in the multi-lane Ethernet signal; split the OPUk-Xv VC frame structure into x individual OPUk frames that are virtually concatenated; insert corresponding overhead to form OTUk frames; transport the OTUk frames over OTN. The transmitting side further includes a transport lane forming module and a data processing module.

The transport lane forming module is adapted to employ the plurality of timeslot channels configured in the OPUk-Xv to form a plurality of virtually concatenated timeslots channels. The transport lane forming module is further adapted to employ the plurality of PSIs, a plurality of timeslot channels, a plurality of NJO and PJO bytes and corresponding JC bytes to constitute multiple transport lanes. The transmitting side further includes an OPUk-Xv frame configuration module and an OPUk-Xv frame splitting module.

The data processing module is adapted to map each lane of Ethernet data in the multi-lane Ethernet signal into each transport lane in the multiple transport lanes, where each transport lane in the multiple transport lanes is populated with one lane of Ethernet data in the multi-lane Ethernet signal and the populated Ethernet data is transported to the receiving side. The data processing module includes a data populating module and a data transport module.

The data populating module in the data processing module is adapted to populate the PSI bytes in each lane of the transport lane with VC ID information; populate the timeslot channel with Ethernet data; populate NJO and PJO with justification information or Ethernet data; employ JC bytes to indicate the content populated in the NJO and PJO.

The data transport module in the data processing module is adapted to transport the Ethernet data populated in the multi-lane transport lane by the data populating module. The transmitting side may further include an OPUk-Xv frame configuration module, adapted to configure a plurality of pairs of NJO bytes and PJO bytes and corresponding JC bytes or a plurality of PSI bytes in each timeslot channel in the OPUk-Xv frame structure.

The receiving side is adapted to acquire OPUk carrying multi-lane Ethernet signal from the received multiple OTUk; determine each timeslot channel based on the OPUk; extract each lane of data in the multi-lane Ethernet signal from the timeslot channel so as to acquire multi-lane Ethernet signal. The receiving side is further adapted to acquire VC ID information from the PSI bytes in each transport lane after receiving Ethernet data transmitted by the transmitting side via each transport lane, and employ a storage unit to perform a delay compensation on the Ethernet data in the transport lane. The receiving side employs JC bytes in each transport lane to identify whether the content populated in the NJO and PJO is justification information or Ethernet data and extract the Ethernet data from the timeslot channels. The receiving side includes a delay compensation module and a data extracting module.

The delay compensation module is adapted to acquire VC ID information from the PSI bytes in each transport lane, and employ a storage unit to perform a delay compensation on the Ethernet data in the transport lane.

The data extracting module is adapted to employ JC bytes in each transport lane to identify whether the content populated in the NJO and PJO is justification information or Ethernet data and extract the Ethernet data from timeslot channel.

Overall, embodiments of the present invention utilize OTN virtual concatenation to enable multi-lane PHY 100G Ethernet to be transparently transported at a full bit rate. In addition, uncontrollability of the actual transmission delay occurred when multi-lane PHY 100GE traverses over the OTN is also addressed. Embodiments of the present invention provide an easy and readily feasible approach for accommodating the existing OTN hierarchy and the VC method. In this way, OTN transport lane has a much more efficient utilization, and 100GE transport cost is reduced.

When the method for transporting Ethernet data over OTN according to the present invention is embodied in an independent software, such software may be stored in any type of computer-readable storage medium. For instance, the software may be stored in a record media such as a disc-shaped medium in magnetic, optic or magnetic-optic form which can be inserted in a driver of a computer system. Alternatively, the software may be stored in a solid record medium which is stored in the computer system such as a hard driver, or a solid-type computer storage. In practice, the storage medium that stores the software program code for implementing the function of the foregoing embodiments is provided to a system or a device. The computer (or CPU or MPU) manipulating the system or device implements the function by reading and executing the program code stored in the storage medium. In such case, the program code read from the storage medium achieves the functionality of the foregoing embodiments and the medium storage storing such program codes is construed as a subject matter of the present invention.

The foregoing is merely exemplary embodiments of the present invention, while the scope of the present invention is not limited to such embodiments. Any variations or equivalents can be readily appreciated by those skilled in the art. These variations or equivalents shall be construed as fall within the scope of the present invention. Therefore, the scope of the present invention should be determined by the scope of the claims.

What is claimed is:

1. A method for transporting a multi-lane Ethernet signal, comprising:
  configuring a number of timeslot channels in an Optical channel Payload Unit-k virtual concatenation frame (OPUk-Xv) based on number of lanes of the multi-lane Ethernet signal;
  assigning each timeslot channel to a corresponding lane of Ethernet data in the multi-lane Ethernet signal;
  mapping each lane of the Ethernet data in the multi-lane Ethernet signal into each corresponding timeslot channel;
  populating each of negative justification opportunity (NJO) bytes and positive justification opportunity (PJO) bytes of each timeslot channel with a content of justification information or Ethernet data according to a frequency difference between each lane of the Ethernet data in the multi-lane Ethernet signal and each corresponding timeslot channel; and
  indicating, in justification control (JC) bytes, whether the content populated in each of the NJO bytes and the PJO bytes is the justification information or the Ethernet data;
  splitting the OPUk-Xv carrying the multi-lane Ethernet signal into a plurality of Optical channel Transport Unit-k (OTUk) frames for transmission.

2. The method of claim 1, wherein the frequency difference between each lane of Ethernet data in the multi-lane Ethernet signal and each corresponding timeslot channel is determined by status of a storage associated with each lane of the Ethernet data.

3. The method of claim 1, wherein the splitting of the OPUk-Xv carrying the multi-lane Ethernet signal into a plurality of OTUk for transmission comprises:
  inserting overhead bytes in the OTUk frames, and setting a predetermined number in payload structure identifier (PSI) bytes of the overhead bytes, wherein the predetermined number indicates that a type of mapping is asynchronous constant bit rate (CBR) and virtual concatenation multi-lane frames.

4. The method of claim 1, further comprising:
  increasing or decreasing partial bandwidth of OPUk transport lanes of respective timeslot channels by using a link capacity adjustment scheme protocol so as to complete a transport of the multi-lane Ethernet signal if OPUk-Xv is OPU1e-10v or OPU2e-10v and when a failure occurs or bandwidth adjustment is performed on at least one lane of the multi-lane Ethernet signal.

5. The method of claim 1, wherein the splitting of the OPUk-Xv carrying multi-lane Ethernet signal into a plurality of OTUk frames for transmission comprises:
  inserting overhead bytes in the OPUk-Xv, and setting a predetermined number in payload structure identifier (PSI) bytes of the overhead bytes, wherein the predetermined number indicates that virtual concatenation multi-lane frames are adopted.

6. The method of claim 1, wherein at least part of the NJO bytes and the PJO bytes is set in an OPUk-Xv payload portion of the OPUk-Xv.

7. An apparatus for transporting a multi-lane Ethernet signal, comprising a processor to execute:
  assign each timeslot channel of a plurality of timeslot channels in an Optical channel Payload Unit-k virtual concatenation frame (OPUk-Xv) to a lane of Ethernet data in the multi-lane Ethernet signal;
  map each lane of the Ethernet data in the multi-lane Ethernet signal into each corresponding timeslot channel;
  populate each of negative justification opportunity (NJO) bytes and positive justification opportunity (PJO) bytes of each timeslot channel with a content of justification information or Ethernet data according to a frequency difference between each lane of the Ethernet data in the multi-lane Ethernet signal and each corresponding timeslot channel; and
  indicate, in justification control bytes, whether the content populated in each of the NJO bytes and the PJO bytes is the justification information or the Ethernet data;
  split the OPUk-Xv carrying the multi-lane Ethernet signal into a plurality of Optical channel Transport Unit-k (OTUk) frames for transmission.

8. The apparatus of claim 7, wherein the frequency difference between each lane of Ethernet data in the multi-lane Ethernet signal and each corresponding timeslot channel is determined by status of a storage associated with each lane of the Ethernet data.

9. The apparatus of claim 7, wherein the processor further executes to increase or decrease partial bandwidth of OPUk transport lanes of respective timeslot channels by using a link capacity adjustment scheme protocol so as to complete a transport of the multi-lane Ethernet signal if OPUk-Xv is OPU1e-10v or OPU2e-10v and when a failure occurs or bandwidth adjustment is performed on at least one lane of the multi-lane Ethernet signal.

10. The apparatus of claim 7, wherein payload structure identifier (PSI) bytes with a predetermined number are set in a OPUk-Xv overhead portion of the OPUk-Xv, wherein the predetermined number indicates that virtual concatenation multi-lane frames are adopted.

11. The method of claim 7, wherein at least part of the NJO bytes and the PJO bytes is set in an OPUk-Xv payload portion of the OPUk-Xv.

12. A system for transporting multi-lane Ethernet signal, comprising:

a transmitter configured to:
  map a plurality of lanes of Ethernet data in a multi-lane Ethernet signal into a plurality of respective timeslot channels in an Optical channel Payload Unit-k virtual concatenation frame (OPUk-Xv), number of the timeslot channels being based on number of the lanes of Ethernet data;
  populate each of negative justification opportunity (NJO) bytes and positive justification opportunity (PJO) bytes of each timeslot channel with a content of justification information or Ethernet data according to a frequency difference between each Ethernet lane of data in the multi-lane Ethernet signal and each corresponding timeslot channel; and
  indicate, in justification control bytes, whether the content populated in each of the NJO bytes and PJO bytes is the justification information or the Ethernet data;
  split the OPUk-Xv carrying multi-lane Ethernet signal into a plurality of Optical channel Transport Unit-k (OTUk) frames for transmission; and a receiver configured to:
  acquire optical channel payload unit-k (OPUk) frames carrying multi-lane Ethernet signal from received plurality of OTUk frames;
  determine each timeslot channel based on the OPUk frames; and
  extract each lane of data in the multi-lane Ethernet signal from a timeslot channel so as to acquire multi-lane Ethernet signal.

13. The system of claim 12, wherein at least part of the NJO bytes and the PJO bytes is set in an OPUk-Xv payload portion of the OPUk-Xv.

* * * * *